US012664278B2

(12) United States Patent
Gangwani et al.

(10) Patent No.: US 12,664,278 B2
(45) Date of Patent: Jun. 23, 2026

(54) SECURITY THREAT MITIGATION

(71) Applicant: Microsoft Technology Licensing, LLC,
Redmond, WA (US)

(72) Inventors: Tvisha Rajesh Gangwani,
Philadelphia, PA (US); Ramesh Chinta,
Sammamish, WA (US); **Sahil Sanjay
Sanghvi, Seattle, WA (US); Kimia
Pourali, Redmond, WA (US); Michael
Richard Yagley**, Kirkland, WA (US);
Shashank Yerramilli, Hyderabad (IN);
Komal Darshil Pandya, Bengaluru
(IN)

(73) Assignee: **Microsoft Technology Licensing,
LLC.**, Redmond, WA (US)

( * ) Notice: Subject to any disclaimer, the term of this
patent is extended or adjusted under 35
U.S.C. 154(b) by 164 days.

(21) Appl. No.: 18/393,607

(22) Filed: Dec. 21, 2023

(65) Prior Publication Data

US 2025/0131089 A1 Apr. 24, 2025

Related U.S. Application Data

(60) Provisional application No. 63/592,136, filed on Oct.
20, 2023.

(51) Int. Cl.
*G06F 21/56* (2013.01)
*G06F 21/55* (2013.01)
(52) U.S. Cl.
CPC .......... *G06F 21/566* (2013.01); *G06F 21/554*
(2013.01); *G06F 2221/034* (2013.01)

(58) Field of Classification Search
CPC ................. G06F 21/566; G06F 21/554; G06F
2221/034; G06F 21/577
See application file for complete search history.

(56) References Cited

U.S. PATENT DOCUMENTS 11,080,718 B2      8/2021   Wiig
11,349,883 B2 *    5/2022   Kossey ................. H04L 69/321
                           (Continued)

FOREIGN PATENT DOCUMENTS

CN          106528845 A   *   3/2017   ........... G06F 40/232
CN          118779877 A   *  10/2024   ......... H04L 63/1466
                           (Continued)

OTHER PUBLICATIONS

Machine translation of Mishra et al, IN 202411008909 A, 3 pages
(Year: 2024).*

(Continued)

*Primary Examiner* — Christopher A Revak
(74) *Attorney, Agent, or Firm* — Barta Jones, PLLC

(57) ABSTRACT

The present disclosure provides methods, systems and stor-
age media for conducting a security review of a system.
Certain examples relate to the use of trained generative AI
to generating a root security query using a machine learning
(ML) generator, based on a system description. A security
requirement associated with the root security query is
extracted, and an indication of the root security query is
output at a user interface. A user input is received in
response, and the ML generator generates a follow-up
request that is output via the user interface. A second user
input is received in response to the follow-up request, and
the ML generator then determines that the security require-
ment is not satisfied by the target system.

20 Claims, 7 Drawing Sheets

(56) References Cited

U.S. PATENT DOCUMENTS

| | | | | |
|---|---|---|---|---|
| 11,468,385 | B2 | | 10/2022 | Bennett |
| 11,620,386 | B2 | | 4/2023 | Agarwal |
| 11,727,143 | B2 * | | 8/2023 | Ackerman ............ G06F 21/567 |
| 11,763,007 | B1 * | | 9/2023 | Nalluri .................. G06F 21/577 726/25 |
| 12,537,843 | B2 * | | 1/2026 | Eshman .............. H04L 63/1433 |
| 2021/0182332 | A1 * | | 6/2021 | Donaldson .......... G06F 21/6245 |
| 2022/0038490 | A1 | | 2/2022 | Thakur |
| 2022/0311797 | A1 | | 9/2022 | Shavlik |
| 2022/0366354 | A1 * | | 11/2022 | Maiman ............... G06Q 10/083 |
| 2022/0405484 | A1 | | 12/2022 | Kanchibhotla |
| 2022/0405739 | A1 | | 12/2022 | Sindhu |
| 2022/0414463 | A1 | | 12/2022 | Mittal et al. |
| 2023/0004655 | A1 * | | 1/2023 | Poulin ................... G06F 21/577 |
| 2024/0070270 | A1 * | | 2/2024 | Mace .................... G06F 21/554 |
| 2024/0096312 | A1 * | | 3/2024 | Gupta .................. G10L 15/063 |
| 2024/0414191 | A1 * | | 12/2024 | Humphrey .......... H04L 63/1433 |
| 2025/0094619 | A1 * | | 3/2025 | Pasumarthi ........... G06F 40/295 |
| 2025/0111093 | A1 * | | 4/2025 | Mantin ................. G06F 21/629 |

FOREIGN PATENT DOCUMENTS

| | | | | | |
|---|---|---|---|---|---|
| CN | 119293162 | A | * | 1/2025 | .............. G06N 5/04 |
| IN | 202411008909 | A | * | 2/2024 | |
| KR | 102088388 | B1 | | 4/2020 | |
| TW | 1812491 | B | | 8/2023 | |
| WO | WO-2025014303 | A1 | * | 1/2025 | .............. G09B 5/08 |

OTHER PUBLICATIONS

Machine translation of Guo, CN 119293162 A, 1 page (Year: 2025).*

Machine translation of Liu, CN 118779877 A, 1 page (Year: 2024).*

Machine translation of Fu, CN 106528845 A, 3 pages (Year: 2017).*

"STRIDE (Security)", Retrieved From: https://en.wikipedia.org/wiki/STRIDE_model, Sep. 25, 2023, 2 pages.

Adam C, et al., "Large Language Models and Intelligence Analysis", Retrieved From: https://cetas.turing.ac.uk/publications/large-language-models-and-intelligence-analysis, Jul. 5, 2023, 14 pages.

Bolanos, et al., "What is Semantic Kernel?", Retrieved From: https://web.archive.org/web/20230711204340/https://learn.microsoft.com/en-us/semantic-kernel/overview/, Jul. 11, 2023, 7 pages.

Bolanos, Matthew, "Understanding the kernel", Retrieved From: https://learn.microsoft.com/en-us/semantickernel/concepts/kernel?tabs=Csharp&pivots=programming-language-csharp, Apr. 16, 2025, 4 pages.

Driess, Danny, "Palm-E: An Embodied Multimodal Language Model", Retrieved From: https://research.google/blog/palm-e-an-embodied-multimodal-language-model/, Mar. 10, 2023, 10 pages.

Eltamawy, Sami, "Mastering Threat Modeling Using AI: A Practical Guide with ChatGPT", Retrieved From: https://www.samieltamawy.com/mastering-threat-modeling-using-ai-a-practical-guide-with-chatgpt/, Aug. 7, 2023, 5 pages.

Ferrag, et al., "Revolutionizing Cyber Threat Detection with Large Language Models: A privacy-preserving BERT-based Lightweight Model for IoT/IIoT Devices", In Repository of arXiv:2306. 14263v2, Feb. 8, 2024, 16 pages.

Geib, et al., "Getting started with the Threat Modeling Tool", Retrieved From: https://learn.microsoft.com/en-us/azure/security/develop/threat-modeling-tool-getting-started, Aug. 25, 2022, 9 pages.

Geib, et al., "Microsoft Threat Modeling Tool", Retrieved From: https://learn.microsoft.com/en-us/azure/security/develop/threat-modeling-tool, Aug. 25, 2022, 2 pages.

Huang, et al., "Language Is Not All You Need: Aligning Perception with Language Models", In Repository of arXiv:2302.14045v2, Mar. 1, 2023, 26 pages.

Lemos, Robert, "Large Language AI Models Have Real Security Benefits", Retrieved From: https://www.darkreading.com/cyber-risk/large-language-ai-models-have-real-security-benefits, Aug. 3, 2022, 4 pages.

Saxe, et al., "GPT-3 and Me: How Supercomputer-scale Neural Network Models Apply to Defensive Cybersecurity Problems", Retrieved From: https://i.blackhat.com/USA-22/Wednesday/US-22-Saxe-GPT3-and-Me.pdf, Aug. 10, 2023, 53 pages.

Shostack, Adam, "Security Briefs—Getting Started With the SDL Threat Modeling Tool", Retrieved From: https://learn.microsoft.com/en-us/archive/msdn-magazine/2009/january/security-briefs-getting-started-with-the-sdl-threat-modeling-tool, Jan. 2009, 10 pages.

Wei, et al., "Language Models Perform Reasoning via Chain of Thought", Retrieved From: https://research.google/blog/language-models-perform-reasoning-via-chain-of-thought/, May 11, 2022.

Yin, et al., "A Survey on Multimodal Large Language Models", In Repository of arXiv:2306.13549v4, Nov. 29, 2024, 18 pages.

Zhang, et al., "Multimodal Chain-of-Thought Reasoning in Language Models", In Repository of arXiv:2302.00923v1, Feb. 2, 2023, 18 pages.

International Search Report and Written Opinion received for PCT Application No. PCT/US/2024048052, Nov. 4, 2024, 13 pages.

Kaheh, et al., "Cyber Sentinel: Exploring Conversational Agents in Streamlining Security Tasks with GPT-4", Retrieved from: https://arxiv.org/pdf/2309.16422, Sep. 28, 2023, 10 Pages.

International Preliminary Report on Patentability (Chapter I) received for PCT Application No. PCT/US2024/048052, mailed on Apr. 30, 2026, 09 Pages.

* cited by examiner

Figure 4

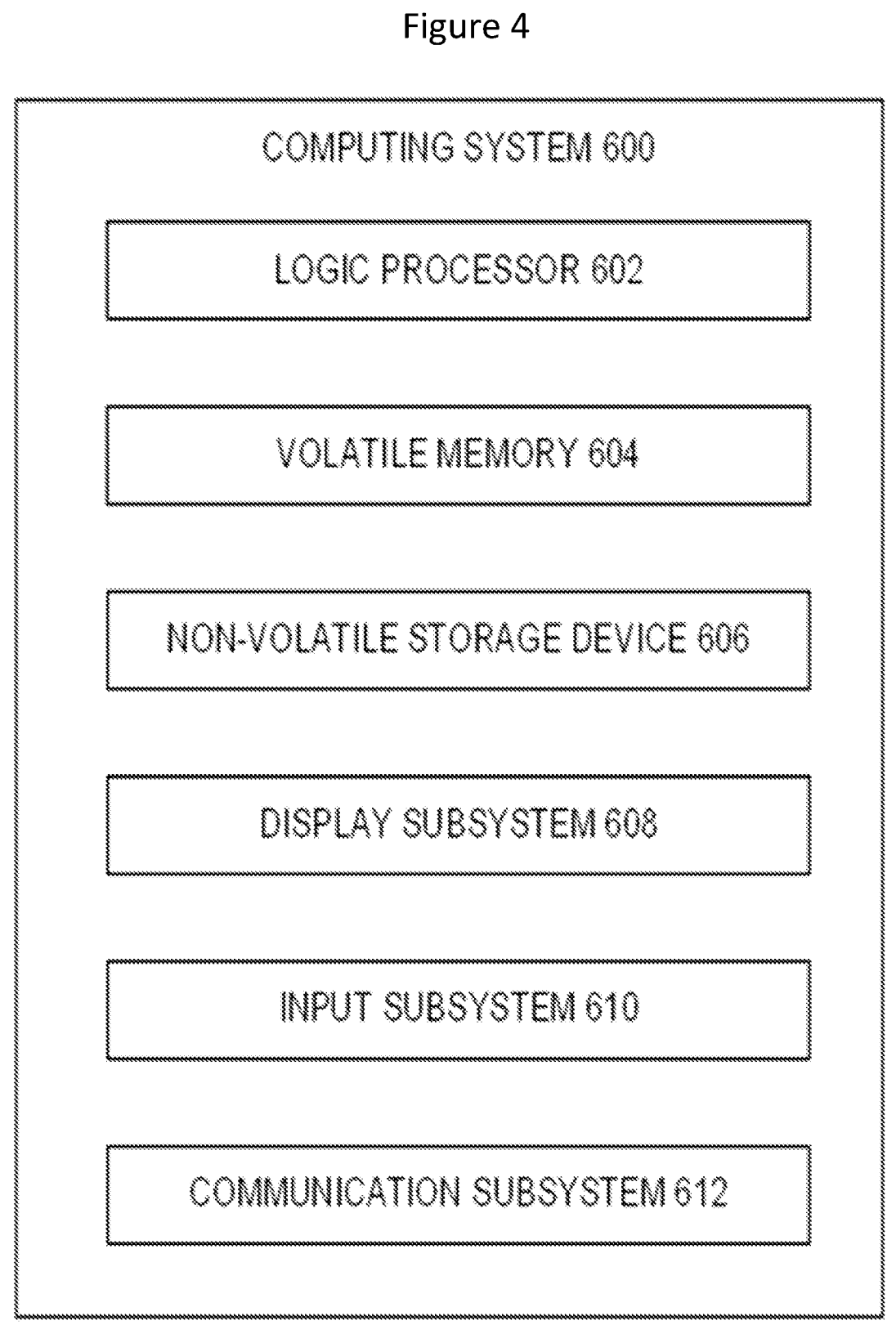

COMPUTING SYSTEM 600

LOGIC PROCESSOR 602

VOLATILE MEMORY 604

NON-VOLATILE STORAGE DEVICE 606

DISPLAY SUBSYSTEM 608

INPUT SUBSYSTEM 610

COMMUNICATION SUBSYSTEM 612

Figure 5

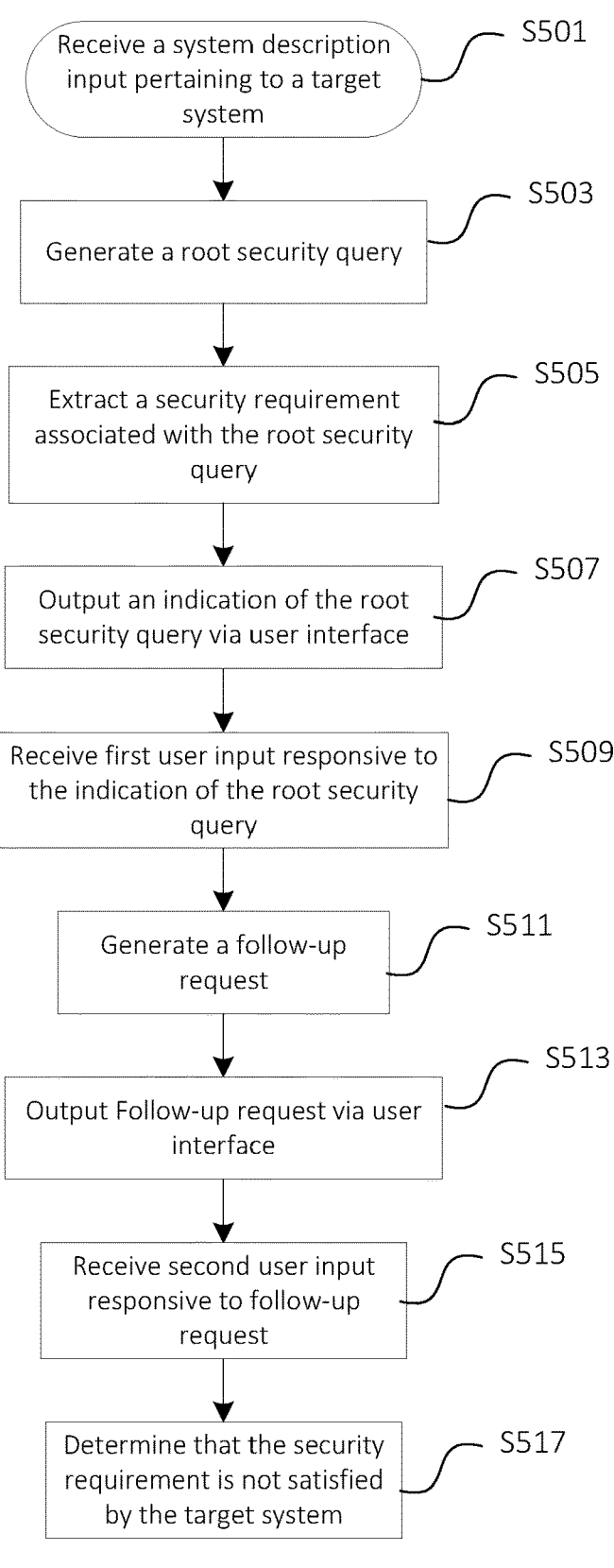

S501 — Receive a system description input pertaining to a target system

S503 — Generate a root security query

S505 — Extract a security requirement associated with the root security query

S507 — Output an indication of the root security query via user interface

S509 — Receive first user input responsive to the indication of the root security query S511 — Generate a follow-up request S513 — Output Follow-up request via user interface S515 — Receive second user input responsive to follow-up request S517 — Determine that the security requirement is not satisfied by the target system

SECURITY THREAT MITIGATION

CROSS-REFERENCE TO RELATED APPLICATION

This application claims priority to U.S. Provisional patent Application No. 63/592,136, entitled "SECURITY THREAT MITIGATION," filed on Oct. 20, 2023, the disclosure of which is incorporated herein by reference in its entirety.

FIELD

The present application relates to identifying and mitigating security risks in computer systems.

BACKGROUND

Security reviews are a foundational requirement for enterprise, service, operational technology (OT) security (among others). Currently, security review processes are conducted manually by human experts and security engineers. This process is arduous, labor-intensive and takes several hours. Delays in the security review process may cause delays in service deployment, or mean that security vulnerabilities in deployed services go undetected. Security vulnerabilities, such as reduced data security or increased exposure to malicious software or other forms of cyberattacks can result from delays or human errors in the security review process, or a combination of both.

Current security review processes may be conducted manually by a security engineer or expert (reviewer) who meets with a service team and creates a list of questions about the potential vulnerabilities of the system. The reviewer may then generate a report with follow-up tasks and bugs for the service team to implement to secure their service. Overreliance on human input can result in inefficient use of computing or memory resources, for example, as a result of tasks needing to be repeated because of human errors arising in the security review process, inefficiencies in formulating comprehensive security questions, inefficiencies in data gathering, inputting and performing comparisons of the data with requirements, determining most effective mitigation action(s), and/or implementing any mitigation action(s).

SUMMARY

The present disclosure provides methods, systems and storage media for conducting a security review of a system. Certain examples relate to the use of trained generative AI to generating a root security query using a machine learning (ML) generator, based on a system description. A security requirement associated with the root security query is extracted, and an indication of the root security query is output at a user interface. A user input is received in response, and the ML generator generates a follow-up request that is output via the user interface. A second user input is received in response to the follow-up request, and the ML generator then determines that the security requirement is not satisfied by the target system.

BRIEF DESCRIPTION OF THE DRAWINGS

To assist understanding of the present disclosure and to show how embodiments may be put into effect, reference is made by way of example to the accompanying drawings in which:

FIG. 4 schematically shows an example computing system.

FIG. 5 shows a flowchart that represents an exemplary threat review process.

Figure 1:
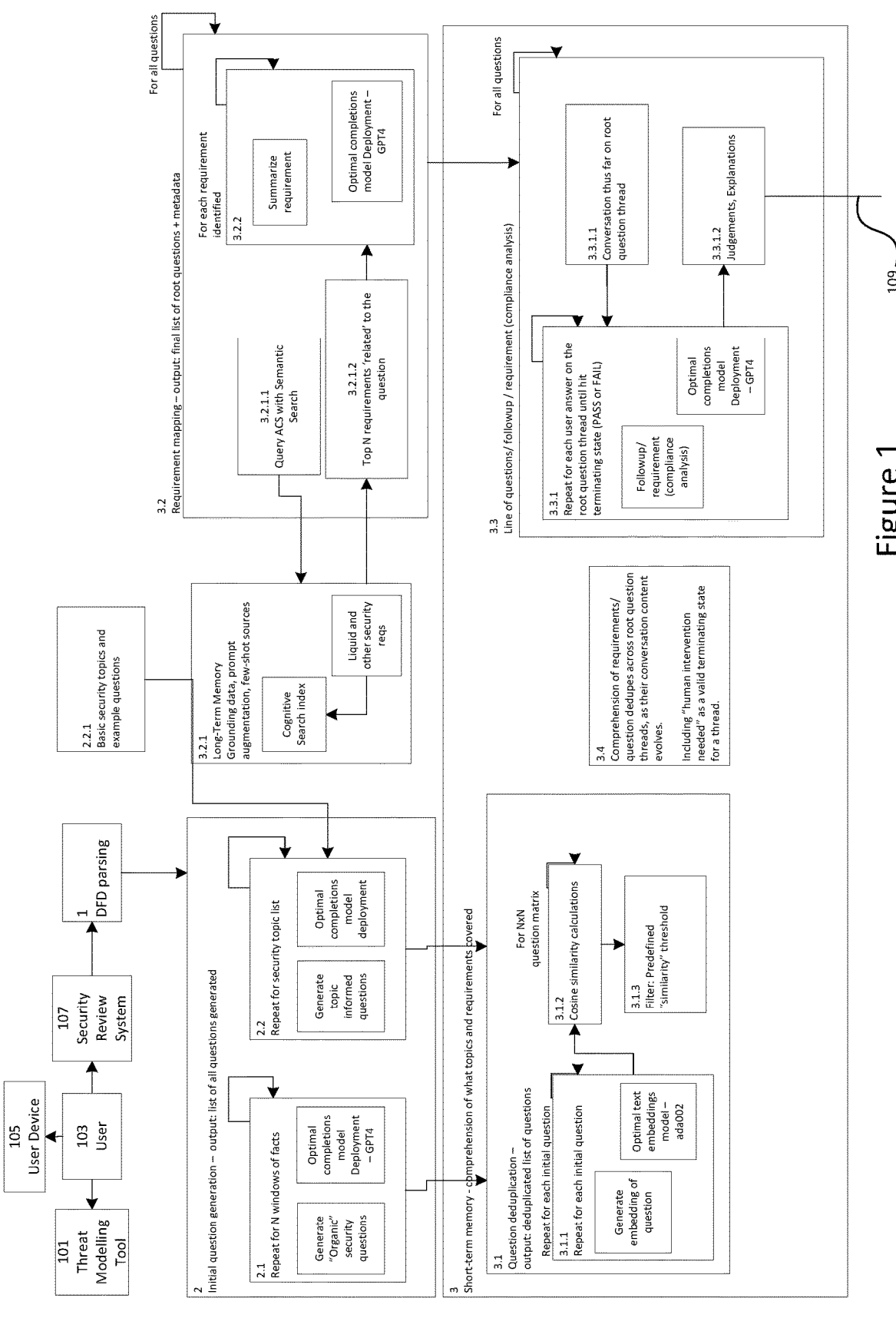
FIG. 1 shows a first portion of a flow diagram that represents a threat identification and review process.

In the drawings, corresponding reference characters indicate corresponding components. The skilled person will appreciate that elements in the figures are illustrated for simplicity and clarity and have not necessarily been drawn to scale. Also, common but well-understood elements that are useful or necessary in a commercially feasible embodiment are often not depicted in order to facilitate a less obstructed view of these various example embodiments.

It will be appreciated that where reference numerals of the form xxx-a, xxx-b etc., are used to denote a particular instance of a feature of a drawing, the same reference numeral without a specified letter suffix (e.g., a, b, etc.) may denote a generic instance of the same feature.

DETAILED DESCRIPTION

Conventional solutions for conducting security reviews are inefficient and may lead to security risks going unresolved. Analysis of data flows, and other aspects of the service in which security risks may manifest, and subsequent steps in identifying risks and planning or coding mitigating features in a service are all currently require manual intervention of a security engineer. Inefficiencies in conventional service security review processes are identified and addressed herein. The description herein details a solution that leverages recent advancements in artificial intelligence (AI), machine learning (ML), and generative models such as Large Language Models (LLMs) or multi-modal generative models to automate aspects of the security review process, thereby improving efficiency, reducing burden of manual review on engineers, and mitigating the likelihood of human error in failing to notice potential security risks. In this context, the term 'security' encompasses, for example, In this context, requirements to address threats, best practices and benchmarks.

In the described examples, a question and report generation process is automated using machine learning and natural language processing (NLP) in combination with programmatic (or 'classical') software engineering. Programmatic components are used to guide and constrain generate ML processes, e.g. by programmatically generating prompts to an LLM or other generative ML model, resulting in improved reliability and consistency in the generated outputs, and a reduced need for human input.

An issue detection system comprises an ML generator that is used to review a target system, identify system issues (such as security vulnerabilities) within the target system and determine mitigating actions (such as cybersecurity threat mitigations). An improved issue detection and mitigation mechanism is provided, which enables security vulnerabilities, to be identified, and therefore mitigated, faster and more reliably, resulting in improved system security, such as improved data security or reduced exposure to malicious software or other forms of cyberattacks. By improving the efficiency of the issue identification and mitigation process, and reducing the scope of human error, more efficient machine operation is achieved.

Herein, an ML generator means a generative machine learning model or a collection of multiple such models (e.g. with different models selected for different tasks). An ML generator consumes prompts and returns responses to the prompts within a "conversation session", also referred to simply as a conversation. A conversation refers to a prompt-response exchange with a generative model, in which history of the exchange is retained for use by the generative model in processing subsequent prompts within the same conversation. Multiple conversations may be established with an ML generator without any implicit sharing of conversation history between different conversations. However, selected data from a first conversation is explicitly shared in a second conversation by extracting the selected data from the first conversation and including it in a prompt or prompts submitted in the second conversation. Such 'context sharing' may be implemented programmatically in prompt generation logic external to the ML generator.

In one example issue detection system, a system description input describing the system is received as input. For example, the system description input may be a data flow diagram (DFD) or data extracted from a DFD (such as text data and/or image data). The system description input is parsed, and the resulting parsed output is used to programmatically generate one or more 'query prompts' that are submitted to the ML generator. The query prompts are configured to cause the ML generator to generate a set of "root security queries" (such as questions) pertaining to the target system. In other words, the ML generator is prompted to devise one or more queries relating to the target system with the aim of identifying issues in the target system that can be mitigated. Each root security query forms the basis of a subsequent line of querying with the aim of identifying a particular class of issues (and potential mitigations). The query prompts may be supplemented with structured content (such as a document) containing cybersecurity threat items (e.g., cybersecurity framework items).

In one example, two sets query prompts are generated, resulting in two sets of root security queries. A first set of query prompts is generated from the parsed security description input alone. For example, the first set of query prompts may be generated on facts extracted from the security description input. A second set of query prompts is generated based on the parsed system description input supplemented by external domain-specific knowledge, such as predetermined security topics, or predetermined examples of security questions. In some cases, this may result in a degree of overlap between the two sets of generated security queries, which can be addressed with a semantic deduplication process.

Purely by way of example, 'facts' extracted from a system description input might include:

1. There is a data flow from 'Internet Browser' to 'Web Frontend' called 'API Request' that crosses the following trust boundaries: [internet]"
2. There is a data flow from 'App Backend' to 'User Database' called 'Get User Info' that crosses the following trust boundaries: [inter-service]

Some examples of import topics for threat modeling processes include:

1. Network Isolation and segmentation
2. Key management
3. Identity management and access controls.
4. Security monitoring.

More generally, the ML generator may be used to generate root security queries systematically and comprehensively from multiple perspectives or contexts. In this manner, one or more root security queries are identified in a systematic and comprehensive manner. This provides a comprehensive basis for issue detection, ultimately leading to improved system security because issues can be identified and mitigated more effectively. Improved efficiency in subsequent machine processing steps arises from appropriate semantic deduplication of the resulting root security queries.

Having determined a final set of one or more root security queries, the ML generator is prompted to associate each root security query with at least one security requirement applicable to the target system, e.g. a requirement pertaining to a particular cybersecurity threat item. The result is least one root security query (e.g., question) regarding a security mitigation, which is associated with the system description input and with the security requirement(s). The security requirement may be obtained from an external structured knowledge source (external to the ML generator), such a security database. The incorporation of external structured knowledge enables the knowledge of the ML generator (captured in its weights/parameters) to be supplemented with up-to-date, domain-specific information that is relevant to a given security context, leading to improved issue detection and thus improved system security.

The at least one root security query is used to guide an interactive human-machine exchange conducted with the ML generator via a user interface, such as a graphical user interface (GUI). Note that, in contrast to a more conventional generative setup, in this context, is the ML generator that leads the exchange, by generated targeted queries at the user interface designed to solicit user input that is required to evaluate the target system in respect of the security requirement. Note that a given root security query may define a line of querying (referred to as a 'query context' herein), resulting in multiple targeted queries being generated at the user interface as the ML generator attempts to solicit the required user input. The system component may for example be a software component (application, process, service, user account etc.) or a hardware component (e.g. a device or network of devices).

Based on user input received at a user interface in relation to a given root security query, the ML generator may identify a component of the represented system as failing to comply with the associated cybersecurity security requirement(s). In response to identifying such a component, at least one security mitigation is performed (e.g., automatically modifying a system setting or parameter, isolating the identified system component, and/or outputting an alert to a security administrator, etc.).

In this context, the ML generator activity solicits the information it requires to determine whether a given requirement is satisfied, thus reducing reliance on human judgement. For example, based on first user input, the ML generator may determine that specific further input is required before it can decide the status of a given requirement, generate a request at the user interface for that specific input that would enable it to decide, and subsequently determine whether the requirement in question is satisfied based on second user input received in response to the request.

The approach described herein reduces human effort, time and opportunity for human error. This automation will allow security reviews to be conducted at scale and at a much faster rate. Additionally, the described approach is able to deliver domain specific conversational understanding of risks associated with the service. Timely and accurate security reviews will reduce enterprise risk by evaluating service at scale as early as possible in the service lifecycle. Each of these factors yields consequent improvements in machine efficiency (as they enable issues to be identified and mitigated more efficiently) and consequent improvements in system security (by increasing the speed at which issues can be identified and mitigated, and reducing the probability of missing significant system issues that pose a security risk). The described approach is able to leverage LLMs and NLP to provide security expert level reviewer capabilities at scale, leading to consequent improvements in system security.

Techniques described herein allow security reviews to be conducted at larger scale and at a much faster rate, with greatly reduced manual effort, and with improved security outcomes. Additionally, the present approach is able to deliver domain-specific conversational understanding of risks associated with the service.

Accurate reviews may also be conducted earlier in the life of the service, as wait times for a security engineering team may be reduced.

In the described approach, a generative model is contextualized with security specific context such as requirements, service topology, security specific topics, security specific topic questions, prioritized and optimized question generation. The generative model may be fine-tuned on a security specific task (or tasks) and/or supported by a retrieval augmented generation (RAG) mechanism.

Conversation quality if improved by deduplicating and filtering questions across a conversation through statistical analysis. As noted, a 'conversation' refers to a prompt-response exchange with a generative model, in which history of the exchange is retained for use by the generative model in processing subsequent prompts.

Review quality may be improved through AB testing of generated reviews of similar services and statistical analysis.

A feedback loop is implemented, in which such reviews and associated remediations are updated responsive to service topology changes in a production environment, which may involve the use of finetuned LLMs and/or ML-based anomaly detection.

A secure blueprint and architecture of a new secure service may be generated from reference architectures of existing services while highlighting potential attack vectors to new service using generative models such as LLM, generative adversarial networks (GANs), encoder-decoder models etc.

Service topologies may be iteratively refined, and security reviews and associated recommendations may be generated, e.g. using finetuned LLMs or RAG-supported LLMs.

The described system has the ability to identify existing or emerging threats in a service and dependency topology and provide recommendations for mitigation, e.g. using finetuned LLMs or RAG-supported LLMs.

LLM based security report generation of completed reviews, e.g., using finetuned LLM/RAG method.

Service topology may be validated with predetermined service configuration templates.

A lineage of threats inherited from dependency services may be identified and visualized by treating all services' designs as one combined graph. For example, inherited risks passed between service nodes may be depicted.

Continuous assurance may be provided using data flow diagrams (DFDs) and/or multi-modal inputs (e.g. a combination of text and image), combined with inferences on service metadata, source, and compliance/KPI data to automatically answer security architecture review questions. Fie tuned Fine-tuned and/or RAG-supported LLMs may be used for this purpose.

Models fine-tuned on data related to security architecture and outcomes (incidents) may be used to improve suggested mitigations during future design phases.

The described approach is Security Review Framework agnostic. The approach is also model-agnostic. One implantation uses a generative pretrained transformer (GPT) model. Other examples may use LLaMA, or BLOOM.

Text-extracted from a DFD is used as input in one implementation. In another implementation, a generative model can ingest and/or generate images or "multi-modal" content (such a combination of text and images).

A user interface (UI) may be implemented with "prompt vs response/drawing" approach. However, other interaction modalities may be used in other implementations.

The present description relates to systems and methods for supporting service teams and security engineers to conduct security reviews for a service. The present techniques work by leveraging generative AI/LLMs to analyze data flow diagrams and other source data to identify areas of potential risk in a service.

There are several known security modelling tools that are used to create data flow diagrams (DFD) for a security review. A DFD may comprise text, and image or a combination of text and image.

The tool may be configured to be agnostic of the input of the data flow diagram.

Techniques described herein are used to develop a list of security-based questions based on DFDs, security requirements, emerging threats and other data using an AI and NLP (Natural Language Processing) driven approach. This forms the foundation of the security review process.

Processes described herein may be implemented locally on a user computer device. However, some or all steps may be conducted at a remote computer system, such as a cloud server. That is, a cloud computing system may be configured to communicate with a user computer device to transmit and receive data over a network, such as the internet. The user computer device may offload processing tasks to the cloud, and may be configured to provide interface between the user and the remote security review system.

Figure 1A:
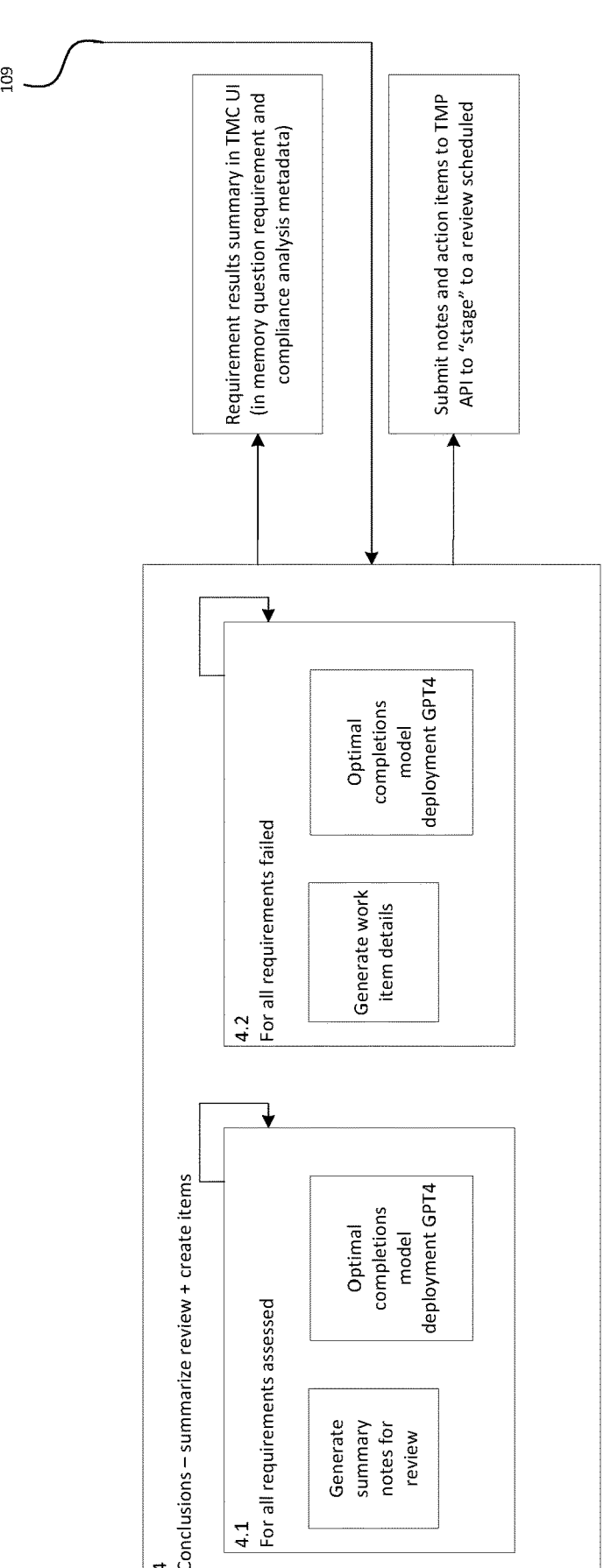
FIG. 1a shows a second portion of a flow diagram.

Reference is made to FIGS. 1 and 1a, which respectively show first and second portions of a high-level flow diagram. The diagram of FIGS. 1 and 1a represents steps of a security threat review process according to some examples.

FIG. 1 shows a threat modelling tool (TMT) 101 which, as described previously herein, may be configured to generate data flow diagrams (DFDs) indicative of flow of information and/or data in a system or process. A user 103 may leverage the TMT 101 to generate, or to assist in the generation of one or more DFD or other structure from which data-flow-related security risks may be identified.

The user 103 of FIG. 1 is shown to be operating a user device 105. The user device 105 may provide a user interface (not shown) through which the user 103 may operate the TMT 101, and other systems configured to implement aspects of the security review process.

In the description that follows, the term 'service under test' may refer to a computing service whose security is in question, and whose architecture/design is being assessed for security risks using the processes described below.

The user device 105 is in communication with a security review system 107, which in may comprise a cloud-based service for implementing the question generation and reporting techniques discussed below.

In a first stage, labelled '1', DFD parsing is conducted. That is, data flow diagrams and/or other data indicative of data flow within the service under test (SUT) may be parsed and interpreted. For example, NLP, image processing and other AI techniques may be implemented to extract natural language facts about the design, architecture and other features of the service under test. A DFD is an example of an image representation of a target system. Image representations and DFDs are examples of a system description input. An SUT is an example of a target system.

In some examples, a GPT (General Pretrained Transformer) model (e.g., GPT3, or GPT4) may be used to interpret the DFD (or text extracted from the DFD) or other input data. In another example, a multimodal model may be used, which can process both text and image data of the DFD for example.

Alternative input data, further to DFDs are shown and described with reference to FIG. 2 later herein.

At a step labelled '2' in FIG. 1, an initial question generation process is performed. The output of step 2 comprises a list of generated questions which may be presented to a security engineer for the purpose of identifying security risks. This output of step 2 may comprise examples of candidate root security queries.

It will be appreciated that the process of identifying questions to provide to the security engineer is presently performed by a review team, requiring substantial manual effort. This process is automated in step 2 (and subsequent steps) of FIG. 1, removing the need for time-consuming manual intervention, and eliminating the risk of human error in failing to spot a risk.

Step 2 includes a first block 2.1, and a second block 2.2. Overall, block 2 represents generation of a set of initial questions for the service engineer. As explained in more detail below, later steps provide for generation of further questions in response to user response to the initial questions.

Block 2.1 represents a question generation process conducted by a programmatic iteration over windows of N 'facts'. The facts may comprise data points or other information interpreted from the input DFD parsed in step 1, and are examples of a parsed output. In this context, programmatic processing refers to rules-based processing that does not utilize machine learning, and instead uses hard-coded rules to generate prompts to the LLM.

The facts may be leveraged to prompt an LLM (such as a GPT model) to generate one or more 'organic' security question for each window of facts derived from the parsed DFD. The questions may be organic in that they are based only on an understanding of the parsed input material, and may be generated independently of any wider context.

The question generation process in block 2.1 may be guided by known security fundamentals frameworks, such as STRIDE.

For context, STRIDE is a machine learning model developed by Microsoft, and configured for identifying computer security threats. STRIDE is an acronym for categories of security threats, including: Spoofing, Tampering, Repudiation, Information disclosure, Denial of service, and Elevation of privilege.

Block 2.2 represents a further process for generating questions. Rather than iterating over facts derived from the DFD, block 2.2 represents question generation by programmatic iteration over a list of priority security topics. Block 2.2 leverages an LLM to generate questions, wherein a prompt to the LLM comprises natural language facts about the DFD as a whole, and/or about the underlying service under test, and the list of security topics. The prompt to the LLM is an example of a query prompt. Questions generated under block 2.2 may be topic-informed, or security domain-specific questions that are tailored to the input DFD.

Generation of questions under block 2.2 is supplemented by augmenting the prompt with basic security topics and example questions, as indicated by block 2.2.1 in FIG. 1. That is, the prompt may guide the LLM to cover appropriate security topics, and to provide an output set of questions that are similar in some regard to the example questions. The appropriate security topics above are examples of a predetermined set of security topics.

Block 2.2.1 may include further contextual data to augment the prompts for generating an initial set of questions. For example, established systems may have readily available data relating to security review and threat mitigation. Data indicative of existing systems and/or previously conducted security reviews may be leveraged in block 2.2.1.

The example questions may guide the LLM to present questions that are of an appropriate scope. That is, providing targeted, direct questions may assist the user to provide a concise, succinct response, and may result in reduced follow-up conversation length between the user and the system.

Output of step 2 may include a set of initial questions. The initial set of questions includes a first subset generated under the process described with reference to block 2.1, and a second subset generated under the process described with reference to block 2.2. The initial set of questions may be examples of candidate root security queries.

Reference is now made to step 3 of FIG. 1. Step 3 focuses on de-duping of questions (in block 3.1), mapping of requirements (in block 3.2), and conducting follow-up conversations (in block 3.3) to reach a set of judgements on how to improve service security.

It will be noted that a 'requirement' as referred herein may represent a standard of security to be met by the service. The term 'best practice requirements', may refer to a standard of service security that is recommended for implementation. The term 'compliance requirements' may relate to a higher standard of security, such as for features that must be implemented for the service to be considered secure.

Step 3 leverages 'short-term' memory to assist comprehension of what topics and requirements have been covered in the review, and manage their status. Tasks leveraging the short term memory may be conducted independently of an LLM such as GPT.

Block 3.1 of step 3 relates to semantic de-duplication of questions provided as output from step 2. That is, multiple questions output from step 2 (which may be examples of candidate root security queries) may effectively request the same information from the user. De-duplication steps are implemented to ensure that duplicate questions are removed. The final output of block 3.1 comprises a semantically de-duplicated list of questions for providing to block 3.2. The deduplicated list may comprise examples of root security queries.

Block 3.1.1 represents an embedding step of block 3.1. According to block 3.1.1., a vector embedding is generated for each question in the initial set. Embedding involves defining an 'embedding space' (e.g., a multi-dimensional embedding space), and mapping data points as vectors within that space. As one example, embeddings may be generated by processing each question using one or more trained neural network layers, such as intermediate or 'hidden' layers of a neural network. Such layers may, for example form part of the ML generator or a separate trained neural network. One example of a suitable embedding model is text-embedding-ada-002, however, it will be appreciated that other embedding models may be used. Whilst neural networks are referred to by way of example, other forms of embedding model may be used. Calculations based on points and vectors within the embedding space may be performed to understand aspects of the embedded data. For example, a semantic similarity between two data points may be determined by assessing the similarity of their respective vectors in the embedding space.

Block 3.1.2 represents a vector calculation step in which each vector in the embedding space—respectively representing a question output from step 2—is assessed against each other vector to determine similarity between the vectors and therefore the associated questions. For each vector in the space, cosine similarity may be calculated with respect to each other vector in the vector space.

Calculating a cosine similarity includes taking a dot product of two vectors and dividing the result by the product of the scalar length of each vector. The result is equal to the cosine of the angle between those vectors:

$$\cos \theta = \frac{a \cdot b}{|a||b|}$$

Where N questions are embedded, the output of block 3.1.2 may comprise an N×N matrix. Each term $s_{ij}$ in the matrix indicates the cosine of the angle between vectors $v_i$ and $v_j$ in the embedding space, and therefore indicates a similarity between those two vectors. Other techniques for determining vector similarity are known, and the filtering based on similarity may be based on any other suitable technique.

Block 3.1.3 represents a filtering step in which each term $s_{ij}$ in the matrix is compared to a predefined similarity threshold. If a term corresponding to particular vectors exceeds the threshold, the questions associated with those particular vectors may be considered to be too semantically similar, i.e., they are dupes of each other and only one of the questions needs to be presented to the user.

After filtering at block 3.1.3, a de-duped set of questions is provided for requirement mapping by block 3.2.

Block 3.2 is directed to a requirement mapping process, which outputs a final list of root questions for presenting to the user 103 along with metadata representing the associated requirement mappings. Sub-block 3.2.1 represents incorporation of long-term memory to provide grounding data, prompt augmentation, and few shot sources for mapping a requirement to each question.

The long-term memory resources are accessed by a query with a semantic search, as represented by block 3.2.1.1. The search may be performed by an Azure Cognitive Search (ACS) query on an indexed set of security requirements held in the long term memory. The query with the semantic search is an example of a requirement prompt.

A set of the top N requirements may be returned for each question, as represented by block 3.2.1.2. For each requirement, a natural language summary of the requirement is generated by a large language model based on a prompt indicating the question, the top N requirements, and prompt augmentation material from long term memory.

Block 3.3 indicates a 'line of questioning', or 'compliance analysis' process, in which a conversation is held between the user 103 and the security review system 107, using LLM chat functions. The chat function is an example of a conversation session, such as the conversations session 1510 of FIG. 6. Each root question, being an example of a root security query, in the set of root questions output from block 3.2 may be presented to the user 103, e.g., through a user interface of the user device 105. Presenting a root question is an example of outputting, via a user interface, an indication of the root security query. The user interface may be, for example, the user interface 1500 of FIG. 6, described later. The user interface may provide a conversation session 1510, wherein the conversation is held.

Each question presented to the user may receive an answer, e.g., a natural language answer provided by the user 103. In response to the user providing an answer, a follow-up question may be provided for answering by the user. A follow up question is an example of a follow-up request. A natural language answer to a root question may be an example of a 'first' user input received responsive to the indication of the root security query. A natural language answer to a follow-up request is an example of a 'second' user input.

The question-and-answer process between user 103 and the security review system 107 may continue until a terminating state is determined from the conversation. That is, each response provided by the user to a root question may be fed back into LLM for determining a termination state or, if no termination state can be determined, generating a follow-up question. Follow up questions to a particular root question may be generated by the LLM based on a prompt comprising the requirement and the content of the conversation held so far on the root question thread.

The LLM, such as GPT, LLAMA, or BLOOM, may be provided with additional information to determine if the requirement is passed, based on the user response. For example, data relating to known security solutions implemented in other services may be provided to the LLM to assist in judging the state of some requirements.

GPT may make a judgement based on all the information provided each time it is called (e.g., given more information from the user/conversation).

The terminating states determinable by the LLM for a particular conversation thread (i.e., stemming from a particular root question) may include 'Pass', 'Fail', or 'human intervention needed'. Returning a terminating state of 'Fail' is an example of determining using the ML generator that the security requirement is not satisfied by the target system.

Judgements, or indications of a determined terminating state, are output with explanations as to why the state has been determined, as indicated by block 3.3.1.2.

Block 3.4 represents overall comprehension of requirement and question deduplication across the root question threads, as the conversation and compliance analysis evolves over the course of the thread model review session. Block 3.4 may be implemented using a combination of vector storage (embedding) of conversations (e.g., with cosine similarity analysis) and with additional prompting with 'similar' conversation extracts or 'snippets' from other threads.

A 'thread' will be understood as a distinct set of questions and answers based on a particular root question.

The overall output from part 3 may comprise a conversation transcript, the determined requirements and their respective determined states, and reasoning behind the judgement for each determined state.

Overall output from part 3 is represented by line 109 of FIG. 1. Line 109 is represented as an input to part 4 shown in FIG. 1a, which is now described.

Part 4 represents a conclusion step for summarizing the review and generating action items and/or directions for improving security in the system represented by the input DFD (or other data). Presenting action items, work items, and directions via a user interface is an example of generating an alert at a user interface. Generation of such an alert is an example of a mitigation action.

As represented by block 4.1, an LLM may be prompted to generate, for each requirement assessed, a set of summary notes for future reference by the user. E.g., a set of natural language summary notes.

As represented by block 4.2, for each requirement that is determined to be in a 'fail' state—i.e., for each standard of security that is determined to not be met-work items detailing actions the user should take in order to mitigate potential design vulnerabilities are generated. That is, actions may be generated which, when implemented, may result in a formerly failed requirement being determined to be met. Modifying a setting or parameter of the target system, or isolating a component of the target system may be examples of a mitigation action.

Figure 2:
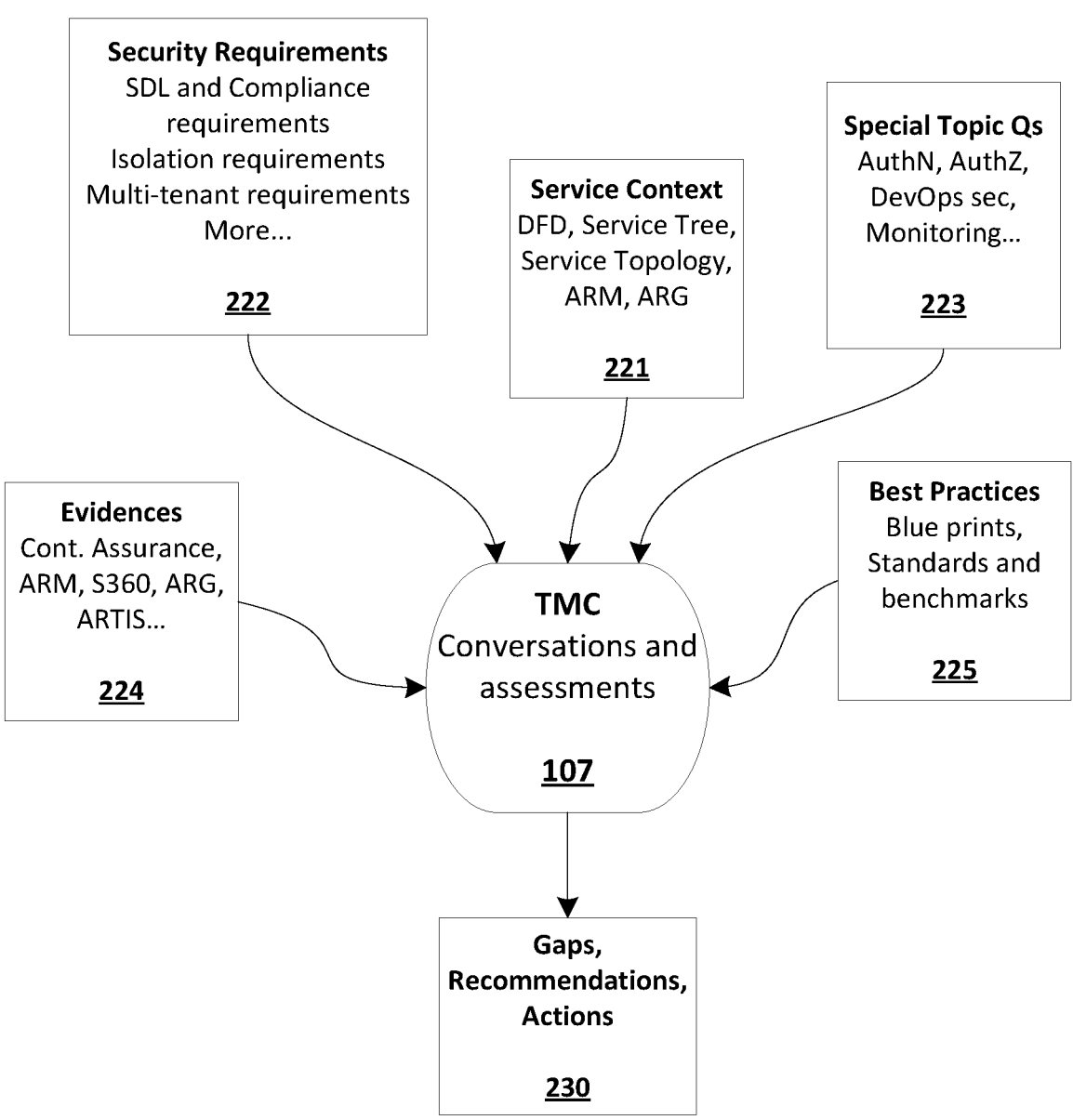
FIG. 2 shows a highly schematic diagram representing inputs and outputs from a system configured to perform a threat review process.

Reference is made now to FIG. 2, which shows a high-level diagram of inputs and outputs from the security review system 107.

The diagram of FIG. 2 shows input data 221-225, which represents data either input by the user 103 to the system 107, or accessible to the system (e.g., from memory) for performing the processes described with reference to FIGS. 1a and 1b. For example, data accessible to the system 107 for generation of prompts to an LLM.

The input data 221-225 includes service context data 221, which may include the DFD referred to above. Other suitable service context data 221 includes a service tree, service topology, ARM, ARG, or other suitable representations of the service under test.

Security requirements data 222 may include SDL (Security Development Lifecycle) and compliance requirements, isolation requirements, multi-tenant requirements, and data indicating other requirements for providing a secure service.

Best practices data 225 may comprise blueprints, standard practices, and benchmark data indicating best practices for providing a secure service.

Output data 230 from the security review system 107, as described in more detail with reference to FIG. 1a, comprises indications of security risks (i.e., gaps in security of the service under test), natural language recommendations for improving compliance, matching best practices etc., and specific actions which may be taken to mitigate the identified risks.

Examples herein provide generative AI-driven techniques for improving security in the design and operations in target systems and services. The techniques may be based on reference architectures, best practices and current/emerging threats to a target system or service under test.

Referring again to FIGS. 1 and 1A, further details in accordance with some examples are provided:

Machine learning models such as the ML generator referenced above may be finetuned using materials including: security topics, example threat modeling questions, requirements/TSGs/documentation, question/answer forums regarding Secure Development Lifecycle (SDL), and Data Flow Diagrams (DFD), along with the known security implications of security architecture decisions represented in the DFD. This fine-tuned model is used in subsequent steps which involve a semantic kernel (SK) skill that requires an NLP interaction.

A Data Flow Diagram (DFD) is parsed and interpreted in natural language facts about service design/architecture.

Initial question generation is performed based on the DFD. The output is a list of all questions generated based on various methods, such as the following:

Stepping over windows of N facts, organic security questions are generated for each window, guided by security fundamentals frameworks, such as the STRIDE model.

For the entire DFD, iterate over a list of priority security topics to generate topic informed questions.

The generator, when generating topic informed questions, may be provided with one or more priority security topics and example questions, as part of a prompt/model augmentation.

"Short term memory" of the generator, where comprehension of what topics and requirements have been covered in the review and their status, is managed.

Deduplication of an initial combined set of N questions generated based on the above steps may be conducted to arrive at a final output comprising a semantically deduplicated list of questions.

To perform deduplication, for each of the initial combined set of questions, an embedding is generated.

An N×N matrix of cosine similarities of vector embeddings is calculated, the matrix having a value for each combination of questions in the initial combined set.

Questions are filtered based on a predefined similarity threshold.

The deduplicated questions may be mapped to their most relevant requirements. The output of this step is a final list of root questions along with initial metadata necessary to begin questioning and assessment.

"Long term memory" grounding data and prompt/model augmentation sources may be incorporated in the steps that follow.

An Azure Cognitive Search semantic query may be performed on an indexed set of security requirements.

A top N requirements related to the question are returned.

For each requirement identified, the requirement is summarized and associated with the question.

A Line of Questioning may be conducted as part of a conversation session between a user and the ML generator. A follow-up conversation may be conducted to perform requirement (compliance) analysis. For each user input indicating a user answer on the root question thread, a follow-up request generated by the generator may be output at the UI until a terminating state is hit.

When prompting the generator to generate a follow-up request, the generator may be provided with the conversation thus far on the root question thread, with an indication of the requirements being analyzed.

When a terminating state is hit, a judgement is returned from the AI skill. The judgement may be provided with reasoning for the conclusion provided by the security review system.

The security review system provides overall comprehension of requirement and question deduplication across the root question threads, as their conversation and compliance analysis evolve over the course of the threat model review session. This can be achieved with a combination of vector storage of conversation, additional prompting with 'similar' conversation snippets from other threads. That is, the same questions will not be repeated in the conversation session.

Conclusions of threat model review are provided, summarizing the review and generating action items.

For all requirements assessed and the product and review overall, summary notes may be generated for reference.

For requirements that failed, work items detailing the actions a service team or product owner should take are generated, in order to mitigate potential design security vulnerabilities identified by the security review system.

FIG. 4 schematically shows a non-limiting example of a computing system 600, such as a computing device or system of connected computing devices, that can enact one or more of the methods or processes described above, including the security review processes described above.

Computing system 600 is shown in simplified form. Computing system 600 includes a logic processor 602, volatile memory 604, and a non-volatile storage device 606. Computing system 600 may optionally include a display subsystem 608, input subsystem 610, communication subsystem 612, and/or other components not shown in the drawings below.

Logic processor 602 comprises one or more physical (hardware) processors configured to carry out processing operations. For example, the logic processor 602 may be configured to execute instructions that are part of one or more applications, programs, routines, libraries, objects, components, data structures, or other logical constructs. The logic processor 602 may include one or more hardware processors configured to execute software instructions based on an instruction set architecture, such as a central processing unit (CPU), graphical processing unit (GPU) or other form of accelerator processor. Additionally or alternatively, the logic processor 602 may include a hardware processor(s)) in the form of a logic circuit or firmware device configured to execute hardware-implemented logic (programmable or non-programmable) or firmware instructions.

Processor(s) of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor 602 may be virtualized and executed by remotely accessible, networked computing devices configured in a cloud-computing configuration. In such a case, these virtualized aspects are run on different physical logic processors of various different machines.

Non-volatile storage device 606 includes one or more physical devices configured to hold instructions executable by the logic processor 602 to implement the methods and processes described herein. When such methods and processes are implemented, the state of non-volatile storage device 606 may be transformed—e.g., to hold different data. Non-volatile storage device 606 may include physical devices that are removable and/or built-in. Non-volatile storage device 606 may include optical memory (e g., CD, DVD, HD-DVD, Blu-Ray Disc, etc.), semiconductor memory (e g., ROM, EPROM, EEPROM, FLASH memory, etc.), and/or magnetic memory (e.g., hard-disk drive), or other mass storage device technology.

Non-volatile storage device 606 may include nonvolatile, dynamic, static, read/write, read-only, sequential-access, location-addressable, file-addressable, and/or content-addressable devices. Volatile memory 604 may include one or more physical devices that include random access memory.

Volatile memory 604 is typically utilized by logic processor 602 to temporarily store information during processing of software instructions. Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604.

Different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc. When included, display subsystem 608 may be used to present a visual representation of data held by non-volatile storage device 606. The visual representation may take the form of a graphical user interface (GUI). As the herein-described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the internet.

The term computer readable media as used herein may include computer storage media. Computer storage media may include volatile and non-volatile, removable and non-removable media (e.g., volatile memory 604 or non-volatile storage 606) implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by a computing device (e.g. the computing system 600 or a component device thereof).

Computer storage media does not include a carrier wave or other propagated or modulated data signal. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct wired connection, and wireless media such as acoustic, radio frequency (RF), infrared, and other wireless media.

FIG. 5 shows an exemplary security review process in accordance with some examples herein. The security review process may be a computer implemented method comprising steps of receiving, at a step S501, a system description input pertaining to a target system. A next step S503 comprises generating a root security query using a machine learning (ML) generator, based on the system description input.

A next step S505 comprises extracting from a security database a security requirement associated with the root security query. An indication of the root security query is output via a user interface at a step S507.

A next step S509 comprises receiving first user input responsive to the indication of the root security query. Based on the first user input and the security requirement, a follow-up request is generated using the ML generator at a step S511. The follow-up request is output via the user interface at a step S513.

A next step S515 comprises receiving second user input responsive to the follow-up request.

The flow terminates at a step S517, wherein the ML generator determines, based on the second user input, that the security requirement is not satisfied by the target system.

Figure 6:
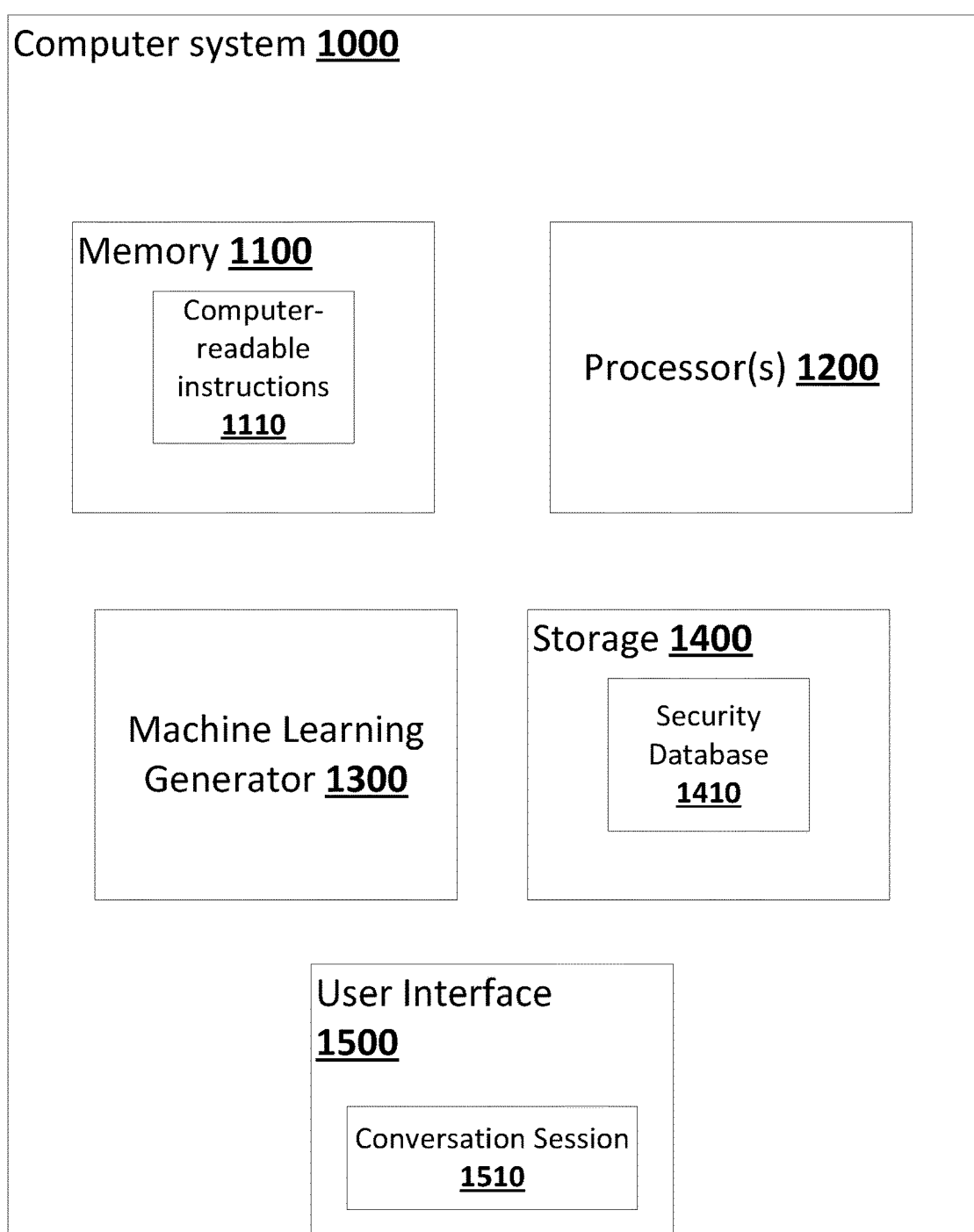
FIG. 6 schematically shows an example computer system.

FIG. 6 schematically shows a computer system 1000 according to some examples. The computer system 1000 may be configured to conduct a security review as laid out in the examples above.

The exemplary computer system 1000 of FIG. 6 comprises at least one memory 1100 configured to store computer-readable instructions 1110.

Figure 3:
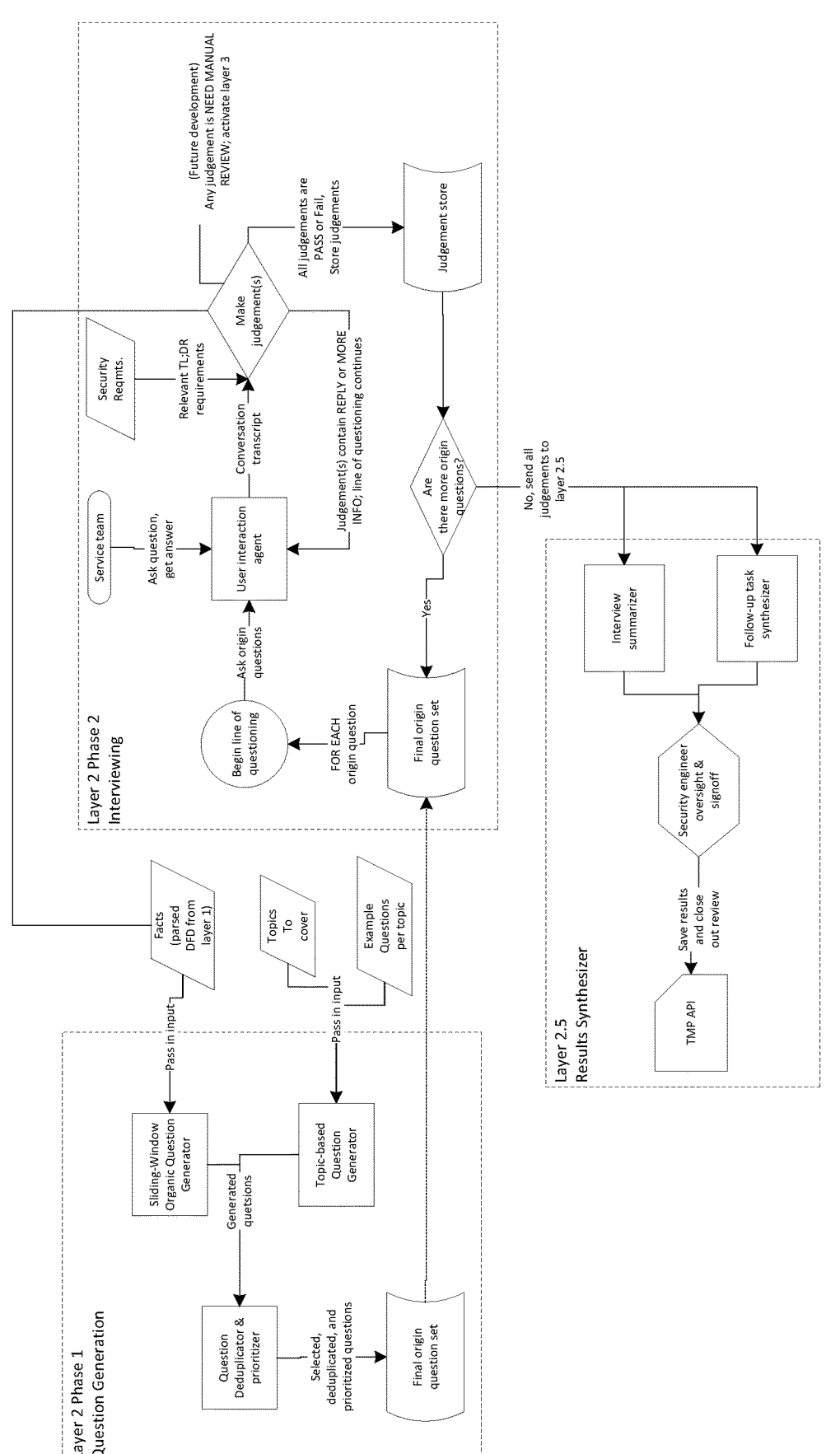
FIG. 3 shows a flow diagram for an issue identification and remediation process.

The system 1000 further comprises at least one hardware processor 1200 coupled to the at least one memory 1100. The computer-readable instructions 1110 may be configured to cause the at least one hardware processor to implement a security review process according to examples above. The computer system 1000 may be an example of the computer system or security review system to which reference is made in the description of FIGS. 1, 1a, and 3.

The system 1000 comprises a machine learning (ML) generator 1300 which may provide generative AI functionalities described above. The ML generator 1300 is an example of the generator recited in the description of FIGS. 1, 1a, 3, and 5.

The system 1000 includes a security database 1410, which may be held in a storage component 1400 of the system 1000. The security database 1410 is a resource from which security requirements may be extracted during a security review process, as described above.

The system 1000 comprises a user interface 1500. The user interface of FIG. 6 is shown to comprise a conversation session 1510, which enables communication between a user and the system 1000, via the generator 1300. The user interface 1500 is an example of the user interface referred to in the description of FIGS. 1, 1a, 3, and 5. The exemplary conversation session 1510 may be the same conversation session referred to previously herein.

It will be appreciated that the above embodiments have been disclosed by way of example only. Other variants or use cases may become apparent to a person skilled in the art once given the disclosure herein. The scope of the present disclosure is not limited by the above-described embodiments, but only by the accompanying claims.

In accordance with a first example of the present disclosure there is provided a computer-implemented method, comprising:

receiving a system description input pertaining to a target system;

generating a root security query using a machine learning (ML) generator, based on the system description input;

extracting from a security database a security requirement associated with the root security query;

outputting via a user interface an indication of the root security query;

receiving first user input responsive to the indication of the root security query;

generating using the ML generator, based on the first user input and the security requirement, a follow-up request;

outputting the follow-up request via the user interface;

receiving second user input responsive to the follow-up request; and determining using the ML generator, based on the second user input, that the security requirement is not satisfied by the target system.

In some examples, the method comprises performing a security mitigation action responsive to determining that the security requirement is not satisfied.

In some examples, the security mitigation action comprises generating an alert at a user interface, modifying a setting or parameter of the target system, or isolating a component of the target system.

In some examples, the method comprises parsing the system description input, resulting in a parsed output; and programmatically generating a query prompt to the ML generator based on the parsed output, resulting in the root security query.

In some examples, the method comprises programmatically generating:

a first query prompt based on the parsed output, and a second query prompt based on the parsed output and a predetermined security topic.

In some examples, programmatically generating the first query prompt comprises:

programmatically iterating over a set of extracted facts of the parsed output; and programmatically generating the second query prompt comprises programmatically iterating over a predetermined set of security topics.

In some examples, generating the root security query comprises:

generating a first candidate root security query and a second candidate root security query using the ML generator, based on the system description input;

generating a first vector embedding for the first candidate root security query and a second vector embedding for the second root candidate security query;

calculating a similarity between the first vector embedding and second vector embedding;

determining that the similarity between the first and second vector embeddings exceeds a threshold; and responsive to determining that the similarity exceeds the threshold selecting the first candidate root security query as the root security query.

In some examples, generating a first candidate root security query and a second candidate root security query using the ML generator based on the system description input comprises:

parsing the system description input, resulting in a parsed output;

programmatically generating one or more query prompt to the ML generator based on the parsed output; and applying the ML generator to the one or more query prompt.

In some examples, extracting a security requirement associated with the root security query comprises generating a requirement prompt, to query an indexed set of security requirements stored in a long-term memory of the ML generator.

In some examples, the ML model comprises one of: a generative pretrained transformer (GPT) model, BLOOM, or LLaMA.

In some examples, receiving the system description input comprises receiving an image representation of the target system.

In accordance with a second example of the present disclosure there is provided a computer system comprising:

at least one memory configured to store computer-readable instructions; and at least one hardware processor coupled to the at least one memory, wherein the computer-readable instructions are configured to cause the at least one hardware processor to:

receive a system description input pertaining to a target system;

generate a root security query using a machine learning (ML) generator, based on the system description input;

extract from a security database a security requirement associated with the root security query;

initiate with the ML generator a conversation session associated with the root security query;

output in the conversation session an indication of the root security query;

receive in the conversation session first user input responsive to the indication of the root security query;

based on the first user input and the security requirement, output in the conversation a follow-up request;

receive in the conversation session second user input responsive to the follow-up request;

based on the second user input, determine that the security requirement is not satisfied by the target system.

In some examples, the computer-readable instructions are configured to cause the at least one hardware processor to perform a security mitigation action responsive to determining that the security requirement is not satisfied.

In some examples, the security mitigation action comprises generating an alert at a user interface, modifying a setting or parameter of the target system, or isolating a component of the target system.

In some examples, the computer-readable instructions are configured to cause the at least one hardware processor to:

parse the system description input, resulting in a parsed output; and programmatically generate a query prompt to the ML generator based on the parsed output, resulting in the root security query.

In some examples, the computer-readable instructions are configured to cause the at least one hardware processor to programmatically generate:

a first query prompt based on the parsed output, and a second query prompt based on the parsed output and a predetermined security topic.

In some examples, the computer-readable instructions configured to cause the at least one hardware processor to generate the root security query further cause the at least one hardware processor to:

generate a first candidate root security query and a second candidate root security query using the ML generator, based on the system description input;

generate a first vector embedding based on the first candidate root security query;

generate a second vector embedding based on the second candidate root security query;

calculate a similarity between the first vector embedding and second vector embedding;

determine that the similarity between the first and second vector embeddings exceeds a threshold; and responsive to determining that the similarity exceeds the threshold, select the first candidate root security query as the root security query.

In some examples, the computer-readable instructions are configured to cause the at least one hardware processor to generate a requirement prompt to extract the security requirement associated with the root security query, the requirement prompt configured to query an indexed set of security requirements stored in a long-term memory of the ML generator.

In some examples, the computer-readable instructions are configured to cause the at least one hardware processor to receive a system description input in the form of an image representation of the target system.

In accordance with a third example of the present disclosure there is provided computer-readable storage media embodying computer readable instructions, the computer-readable instructions configured upon execution on at least one hardware processor to cause the at least one hardware processor to:

receive a system description input pertaining a target system;

generate, using a machine learning (ML) generator, based on the system description input, a first candidate root security query and a second candidate root security query;

generate a first vector embedding based on the first candidate security query;

generate a second vector embedding based on the second candidate security query;

calculate a similarity between the first vector embedding and second vector embedding;

determine that the similarity between the first and second vector embeddings exceeds a threshold;

responsive to determining that the similarity exceeds the threshold, select the first candidate security query as a first root security query;

extract from a security database a security requirement associated with the first root security query;

output via a user interface an indication of the first root security query;

receive in the conversation session user input responsive to the indication of the first root security query;

based on the user input, determine that the security requirement is not satisfied by the target system.

The invention claimed is:

1. A computer-implemented method, comprising:

receiving a system description input pertaining to a target system;

generating a root security query using a machine learning (ML) generator, based on the system description input;

extracting from a security database a security requirement associated with the root security query;

outputting via a user interface an indication of the root security query;

receiving first user input responsive to the indication of the root security query;

generating using the ML generator, based on the first user input and the security requirement, a follow-up request;

outputting the follow-up request via the user interface;

receiving second user input responsive to the follow-up request; and determining using the ML generator, based on the second user input, that the security requirement is not satisfied by the target system.

2. The computer-implemented method of claim 1, comprising performing a security mitigation action responsive to determining that the security requirement is not satisfied.

3. The computer-implemented method of claim 2, wherein the security mitigation action comprises generating an alert at a user interface, modifying a setting or parameter of the target system, or isolating a component of the target system.

4. The computer-implemented method of claim 1, comprising:

parsing the system description input, resulting in a parsed output;

programmatically generating a query prompt to the ML generator based on the parsed output, resulting in the root security query.

5. The computer-implemented method of claim 4, comprising programmatically generating:

a first query prompt based on the parsed output, and a second query prompt based on the parsed output and a predetermined security topic.

6. The computer-implemented method of claim 5, wherein:

programmatically generating the first query prompt comprises programmatically iterating over a set of extracted facts of the parsed output; and programmatically generating the second query prompt comprises programmatically iterating over a predetermined set of security topics.

7. The computer-implemented method of claim 1, wherein generating the root security query comprises:

generating a first candidate root security query and a second candidate root security query using the ML generator, based on the system description input;

generating a first vector embedding for the first candidate root security query and a second vector embedding for the second root candidate security query;

calculating a similarity between the first vector embedding and the second vector embedding;

determining that the similarity between the first and second vector embeddings exceeds a threshold; and responsive to determining that the similarity exceeds the threshold selecting the first candidate root security query as the root security query.

8. The computer implemented method of claim 7, wherein generating the first candidate root security query and the second candidate root security query using the ML generator based on the system description input comprises:

parsing the system description input, resulting in a parsed output;

programmatically generating one or more query prompt to the ML generator based on the parsed output; and applying the ML generator to the one or more query prompt.

9. The computer-implemented method of claim 1, wherein extracting the security requirement associated with the root security query comprises generating a requirement prompt, to query an indexed set of security requirements stored in a long-term memory of the ML generator.

10. The computer-implemented method of claim 1, wherein the ML generator comprises one of: a generative pretrained transformer (GPT) model, BLOOM, or LLAMA.

11. The computer-implemented method of claim 1, wherein receiving the system description input comprises receiving an image representation of the target system.

12. A computer system comprising:

a memory configured to store computer-readable instructions; and a hardware processor coupled to the at least one memory, wherein the computer-readable instructions are configured to cause the hardware processor to:

receive a system description input pertaining to a target system;

generate a root security query using a machine learning (ML) generator, based on the system description input;

extract from a security database a security requirement associated with the root security query;

initiate with the ML generator a conversation session associated with the root security query;

output in the conversation session an indication of the root security query;

receive in the conversation session first user input responsive to the indication of the root security query;

based on the first user input and the security requirement, output in the conversation session a follow-up request;

receive in the conversation session second user input responsive to the follow-up request;

based on the second user input, determine that the security requirement is not satisfied by the target system.

13. The computer system of claim 12, wherein the computer-readable instructions are configured to cause the hardware processor to perform a security mitigation action responsive to determining that the security requirement is not satisfied.

14. The computer system of claim 13, wherein the security mitigation action comprises generating an alert at a user interface, modifying a setting or parameter of the target system, or isolating a component of the target system.

15. The computer system of claim 12, wherein the computer-readable instructions are configured to cause the hardware processor to:

parse the system description input, resulting in a parsed output; and programmatically generate a query prompt to the ML generator based on the parsed output, resulting in the root security query.

16. The computer system of claim 15, wherein the computer-readable instructions are configured to cause the hardware processor to programmatically generate:

a first query prompt based on the parsed output, and a second query prompt based on the parsed output and a predetermined security topic.

17. The computer system of claim 12, wherein the computer-readable instructions configured to cause the hardware processor to generate the root security query by:

generating a first candidate root security query and a second candidate root security query using the ML generator, based on the system description input;

generating a first vector embedding based on the first candidate root security query;

generating a second vector embedding based on the second candidate root security query;

calculating a similarity between the first vector embedding and the second vector embedding;

determining that the similarity between the first and second vector embeddings exceeds a threshold; and responsive to determining that the similarity exceeds the threshold, selecting the first candidate root security query as the root security query.

18. The computer system of claim 12, wherein the computer-readable instructions are configured to cause the hardware processor to generate a requirement prompt to extract the security requirement associated with the root security query, the requirement prompt configured to query an indexed set of security requirements stored in a long-term memory of the ML generator.

19. The computer system of claim 12, wherein the computer-readable instructions are configured to cause the hardware processor to receive the system description input in a form of an image representation of the target system.

20. Computer-readable storage media embodying computer readable instructions, the computer-readable instructions configured upon execution on a hardware processor to cause the hardware processor to:

receive a system description input pertaining a target system;

generate, using a machine learning (ML) generator, based on the system description input, a root security query;

extract from a security database a security requirement associated with the root security query;

output via a user interface an indication of the root security query;

receive first user input responsive to the indication of the root security query;

generate, using the ML generator, based on the first user input and the security requirement, a follow-up request;

output the follow-up request via the user interface;

receive second user input responsive to the follow-up request; and based on the second user input, determine that the security requirement is not satisfied by the target system.

* * * * *